Dec. 24, 1935.   L. F. CARTER   2,025,569
TRACK RECORDER
Filed Jan. 14, 1932

INVENTOR
Leslie F. Carter
BY
Joseph H. Lipschutz
ATTORNEY

Patented Dec. 24, 1935

2,025,569

UNITED STATES PATENT OFFICE 2,025,569

TRACK RECORDER

Leslie F. Carter, Leonia, N. J., assignor to Sperry Products, Inc., Brooklyn, N. Y., a corporation of New York Application January 14, 1932, Serial No. 586,476

13 Claims. (Cl. 33—144)

This invention relates to improvements in track recorder systems of the type disclosed in the application of Elmer A. Sperry, Serial No. 690,930, filed February 6, 1924. More particularly this invention relates to improvements in track gauge indicators for the purpose of indicating variations from standard track gauge.

It has been found that as the mechanisms used for determining variations in track gauge were mounted on a car which traveled along the rails at normal train speed they sometimes encountered obstructions which resulted in utterly destroying or seriously damaging the equipment. One of the objects of my invention, therefore, is to provide a mounting for these track gauge mechanisms by means of which I overcome the aforesaid difficulties.

Heretofore, it has been the practice to mount each of the gauge members on the respective truck equalizer bars, but said truck bars being capable of movement independently of each other, there sometimes resulted relative movement between the gauge members which was due not to differences in gauge but to variations in position of the truck equalizer bars. It is another object of my invention, therefore, to provide means for insuring a constant baseline between the gauge members so that only variations in gauge will cause an indication of the gauge-indicating mechanism.

Another object of my invention is the provision of means for insuring the proper operating relationship between the gauge members and the rail.

Other objects and advantages of this invention will become apparent in the following detailed description thereof.

Figure 1:
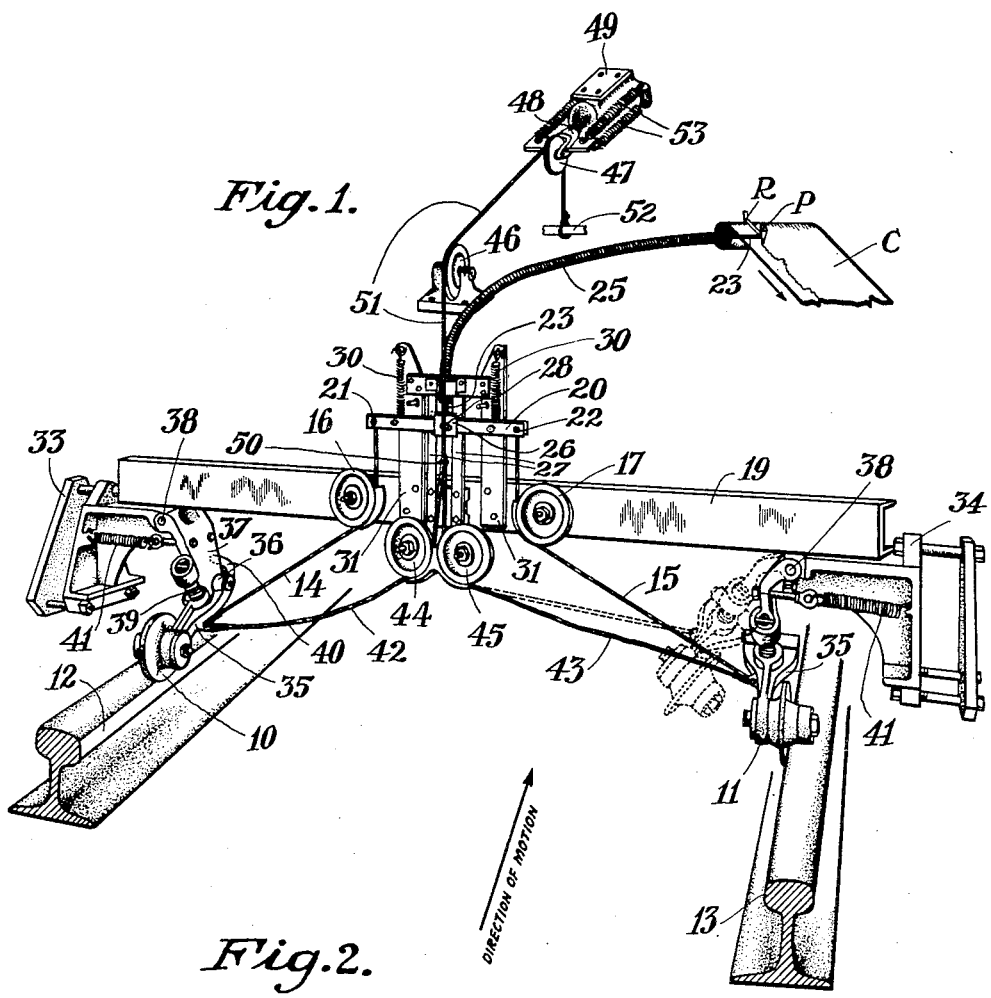
Figure 2:
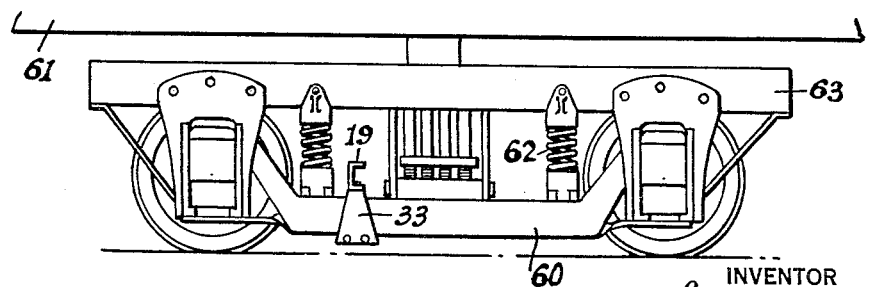

In the accompanying drawing, Figure 1 is a perspective view showing an assembly of a track gauge recording mechanism embodying my invention. Figure 2 is a side elevation showing the independently movable truck of a car.

My track gauge indicating mechanism comprises a pair of track gauges 10 and 11 mounted in a manner hereinafter described so as to engage the inner surfaces 12 and 13 of a pair of rails. The movement of said gauge members 10 and 11 relative to each other caused by the narrowing or widening of the rails is transmitted by a pair of cables 14, 15 which may pass over pulleys 16, 17 mounted on a fixed frame 19 to a beam or evener-bar 20 to the ends 21 and 22 of which said cables 14 and 15 are connected. Said evener-bar will be moved upwardly or downwardly by relative movement of the gauge members 10 and 11 toward or away from each other to cause a core 23 of a Bowden cable to be drawn through the casing 25 of said cable and thus operate an indicator, which may be a clock dial and pointer or a recorder R comprising a pen P operating over a moving chart C. The said evener-bar 20 is mounted for reciprocal and rotary movement by means of a cross-head 26 operating in a pair of guides 27 fixed to the bar 19. The evener-bar 20 is carried by said cross-head and is pivotally mounted at 28 on the end thereof so that when said gauge members 10 and 11 both move in the same direction and to the same degree, said evener-bar 20 will rock around the pivot 28 without causing any movement of Bowden core 23 within sheath 25 because cable 14 will act oppositely to cable 15 and to the same degree, and hence without causing any operation of the indicator because no difference in track gauge has in reality occurred.

The evener-bar 20 is normally suspended in position by means of springs 30 from fixed posts 31 attached to bar 19.

The gauge members 10 and 11 were heretofore independently mounted on the side frames or equalizer-bars of the car truck and, as these frames had independent movement relative to each other, said movement caused variation of the distance between the gauge members and resulted in movement of the evener-bar in the same manner as in the case of a variation in track gauge. To obviate this condition I have provided a fixed baseline in place of the variable baseline heretofore employed. This fixed baseline may be provided by means of a beam member 19 interconnecting the clamps 33 and 34 on the side frames 60 of the trucks whereby the gauge mechanisms are connected to the respective side frames or equalizer-bars of the car-track (see Fig. 2). Said equalizer bars support the car body 61 by means of springs 62 upon which rests the bolsters 63 supporting said car body in the usual manner. Thus it will be seen that it is impossible for one gauge member to be moved relative to the other gauge member by the swaying of one car truck frame with respect to the other since the two frames are now interconnected by means of the rigid member 19 which thus forms a fixed baseline.

In practice it has been found that the gauge members were frequently injured and in some cases completely destroyed by striking obstructions which they met in their path of movement. This was due to the fact that said gauge members were mounted with only limited movement in one plane, that is, only with the capacity for movement in response to variations in track gauge. I have avoided this difficulty by providing a cardan mounting for each of the track gauge members 10 and 11, that is, a mounting to permit oscillation in all directions, so that the members are free to ride over any obstruction which they may meet regardless of the direction of the thrust. The mounting of the gauge members thus comprises an arm 35 which carries the respective gauge member, the said arm being pivoted at 36 in a bracket 37 for movement around a given axis. The said bracket 37 is in turn mounted upon the main frame as, for instance, on the clamp member 33, for pivotal movement around an axis 38 at right angles to the axis 36. A spring member 39 interposed between bracket 37 and arm 35 normally presses said arm downwardly toward operating position. The contact member is here shown as a flange 10 adapted to engage the inner side of the rail head. In order to prevent said contact member from descending too far down, a stop 40 in the form of an extension of said arm 35 beyond pivot 36 engages in back of bracket 37. The said gauge members are moved toward engaging position with the rail head by means of a spring 41 between the fixed frame, in this case the clamp 33, and bracket 37 which tends to move the gauge member outwardly toward engaging or operating position.

It will thus be seen that the gauge members 10 and 11 in operating position are moved downwardly and outwardly, the downward movement being limited to the proper degree to cause proper engagement between the gauge members and the inner surfaces of the rails.

Relative movement between the said gauge members 10 and 11 caused by narrowing or widening of the track gauge will pull upon cables 14 and 15 or permit springs 30 to draw said cables upwardly to cause downward or upward movement of evener-bar 20 to operate the indicator through the Bowden cable. Equal movements of said gauge members in the same direction, however, will rock the evener-bar around its pivot. Relative movement between gauge members 10 and 11 can be due only to variations in track gauge, since the fixed baseline provided by beam 19 connecting the two side frames of the truck through the gauge clamps 33, 34 prevents any relative movement of said gauge members due to a changing baseline.

For moving the gauge members to inoperative position there may be provided a second pair of cables 42, 43 which may extend over pulleys 44, 45 mounted on the main frame and after being joined at a point such as 50 may extend as a single cable 51 over a pulley 46 on the car frame and thence over a pulley 47 on the piston rod 48 of a fluid pressure machine 49, the end of the cable 51 being fixed to the car frame at 52. Said cable 51 and hence the cables 42, 43 and the gauge members 10 and 11 are normally drawn upwardly toward inoperative position by means of heavy springs 53 pulling upon the piston member 48, the said springs being of sufficient strength to overcome the springs 39 and 41.

When it is desired to move the gauge members to operative position, the fluid pressure valve of machine 49 is opened and the piston 48 is moved outwardly against the action of springs 53 to permit the cable 51 to be paid out and thus allow springs 39 and 41 to move the gauge members 10 and 11 to operative position in engagement with the rails.

In accordance with the provisions of the patent statutes, I have herein described the principle and operation of my invention, together with the apparatus which I now consider to represent the best embodiment thereof, but I desire to have it understood that the apparatus shown is only illustrative and that the invention can be carried out by other means. Also, while it is designed to use the various features and elements in the combination and relations described, some of these may be altered and others omitted without interfering with the more general results outlined, and the invention extends to such use.

Having described my invention, what I claim and desire to secure by Letters Patent is:

1. In a track gauge measuring mechanism, a plurality of gauge members adapted to engage the respective rails of the track, a support extending laterally with respect to the track, an arm pivoted on said support at each side for movement about a given axis, a second arm pivoted on each of said first arms for movement about an axis at an angle to said first axis, each of said second arms carrying one of said gauge members, each of said first and second arms being freely movable during the measuring operation, and resilient means adapted normally to move said arms in a direction to bias said gauge members into contact with the respective rails.

2. In a track gauge measuring mechanism, a plurality of gauge members adapted to engage the respective rails of the track, a support extending laterally with respect to the track, an arm pivoted on said support at each side for movement about a given axis, a second arm pivoted on each of said first arms for movement about an axis at right angles to said first axis, each of said second arms carrying one of said gauge members, each of said first and second arms being freely movable during the measuring operation, and resilient means adapted normally to move said arms in a direction to bias said gauge members into contact with the respective rails.

3. In a track gauge measuring mechanism, a plurality of gauge members adapted to engage the respective rails of the track, a support extending laterally with respect to the track, an arm pivoted on said support at each side for movement about an axis longitudinal with respect to the track, a second arm pivoted on each of said first arms for movement about an axis lateral with respect to the track, each of said second arms carrying one of said gauge members, each of said first and second arms being freely movable during the measuring operation, and resilient means adapted normally to move said arms in a direction to bias said gauge members into contact with the respective rails.

4. In a track gauge measuring mechanism, a plurality of gauge members adapted to engage the respective rails of the track, a support extending laterally with respect to the track, an arm pivoted on said support at each side for movement about an axis longitudinal with respect to the track, a second arm pivoted on each of said first arms for movement about an axis lateral with respect to the track, each of said second arms carrying one of said gauge members, each of said first and second arms being freely movable during the measuring operation, resilient means adapted normally to move said arms in a direction to bias said gauge members into contact with the respective rails, and means for limiting the movement of said second arms in one direction.

5. In a track gauge measuring mechanism, a plurality of gauge members adapted to engage the respective rails of the track, a support extending laterally with respect to the track, an arm pivoted on said support at each side for movement about an axis longitudinal with respect to the track, a second arm pivoted on each of said first arms for movement about an axis lateral with respect to the track, each of said second arms carrying one of said gauge members, each of said first and second arms being freely movable during the measuring operation, and means for limiting the downward movement of said second arm.

6. In a track gauge measuring mechanism, a plurality of gauge members adapted to engage the respective rails of the track, a support extending laterally with respect to the track, an arm freely pivoted on said support at each side for movement about an axis longitudinal with respect to the track, a second arm freely pivoted on each of said first arms for movement about an axis lateral with respect to the track, each of said second arms carrying one of said gauge members, and means for limiting the downward movement of said second arm, said last-named means comprising an extension of said second arm adapted to engage said first arm after a predetermined degree of movement of said second arm.

7. In a track gauge measuring mechanism, a plurality of gauge members adapted to engage the respective rails of the track, a support extending laterally with respect to the track, an arm freely pivoted on said support at each side for movement about an axis longitudinal with respect to the track, a second arm freely pivoted on each of said first arms for movement about an axis lateral with respect to the track, each of said second arms carrying one of said gauge members, means normally tending to swing said gauge members outwardly, and means normally tending to swing said gauge members downwardly.

8. In a track gauge measuring mechanism, a plurality of gauge members adapted to engage the respective rails of the track, a support extending laterally with respect to the track, an arm freely pivoted on said support at each side for movement about an axis longitudinal with respect to the track, a second arm freely pivoted on each of said first arms for movement about an axis lateral with respect to the track, each of said second arms carrying one of said gauge members, spring means between said supports and said first arms normally tending to swing said gauge members outwardly, and spring means between said first arms and said second arms normally tending to swing said gauge members downwardly.

9. In a track gauge measuring mechanism, a plurality of gauge members adapted to engage the respective rails of the track, a support extending laterally with respect to the track, an arm freely pivoted on said support at each side for movement about an axis longitudinal with respect to the track, a second arm freely pivoted on each of said first arms for movement about an axis lateral with respect to the track, each of said second arms carrying one of said gauge members, spring means between said support and said first arms normally tending to swing said gauge members outwardly, spring means between said first arms and said second arms normally tending to swing said gauge members downwardly, and means for limiting the downward movement of said gauge members.

10. In a track gauge measuring mechanism adapted to be mounted on a car-truck having normally independently movable side frames, a plurality of gauge members adapted to engage the respective rails of the track, means whereby said gauge members are mounted on the respective frames of the truck, and a rigid beam interconnecting and fixed to said frames.

11. In a track gauge measuring mechanism, a plurality of gauge members adapted to engage the respective rails of the track, a cardan mounting for each of said members, means for supporting said mountings in fixed relation, said mountings being freely movable during the measuring operation, and resilient means adapted normally to move said arms in a direction to bias said gauge members into contact with the respective rails.

12. In a track gauge measuring mechanism, a plurality of gauge members adapted to engage the respective rails of the track, a cardan mounting for each of said members and means for supporting said mountings in fixed relation, said mountings being freely movable during the measuring operation and including means whereby said members may move about an axis lateral with respect to the track, means whereby said members may move about an axis longitudinal with respect to the track during the measuring operation, and resilient means adapted normally to move said arms in a direction to bias said gauge members into contact with the respective rails.

13. In a track gauge measuring mechanism, a plurality of gauge members adapted to engage the respective rails of the track, an indicator, and means whereby said indicator is adapted to be actuated by relative movements of said gauge members, said last-named means comprising a Bowden cable consisting of a pair of relatively movable elements, one of said elements having one end thereof connected to said indicator, an evener-bar connected to the other end of said last-named element and mounted for linear and pivotal movements, and connections between the arms of said bar and the respective gauge members.

LESLIE F. CARTER.